United States Patent
Yilmaz

(10) Patent No.: US 12,195,165 B2
(45) Date of Patent: Jan. 14, 2025

(54) HELICOPTER TAIL FOLDING MECHANISM

(71) Applicant: TUSAS—TURK HAVACILIK VE UZAY SANAYII ANONIM SIRKETI, Ankara (TR)

(72) Inventor: Furkan Yilmaz, Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 0 days.

(21) Appl. No.: 18/521,344

(22) Filed: Nov. 28, 2023

(65) Prior Publication Data
US 2024/0174343 A1  May 30, 2024

(30) Foreign Application Priority Data

Nov. 30, 2022 (TR) ................ 2022/018286

(51) Int. Cl.
*B64C 1/06* (2006.01)
*B64C 1/30* (2006.01)
*B64C 27/04* (2006.01)
*F16D 1/10* (2006.01)

(52) U.S. Cl.
CPC ............... *B64C 1/30* (2013.01); *B64C 1/063* (2013.01); *F16D 1/10* (2013.01); *B64C 27/04* (2013.01); *F16D 2001/103* (2013.01)

(58) Field of Classification Search
CPC .......... B64C 1/063; B64C 27/50; B64C 3/56; B64C 27/04; B64C 27/82
See application file for complete search history.

(56) References Cited

U.S. PATENT DOCUMENTS

| 5,186,573 A * | 2/1993 | Flotow .................... F16D 1/101 464/169 |
| 5,672,112 A * | 9/1997 | Sbabo ..................... F16D 3/185 464/177 |
| 6,050,521 A * | 4/2000 | Regonini ................ B64C 1/063 464/154 |
| 6,168,530 B1 * | 1/2001 | Guimbal ................ B64D 35/00 464/178 |
| 7,771,126 B2 * | 8/2010 | Faass ..................... F16C 19/18 248/580 |
| 10,287,005 B2 * | 5/2019 | Spears ................ F16C 32/0425 |

* cited by examiner

*Primary Examiner* — Brian M O'Hara
(74) *Attorney, Agent, or Firm* — Notaro, Michalos & Zaccaria P.C.

(57) ABSTRACT

A helicopter tail folding mechanism for a tail located on the helicopter has a front region located on the tail, a rear region connected to the front region to make a folding movement around the axis on which it is supported, a first shaft located on the front region and a second shaft located on the rear region enables power to be transmitted to the tail rotor during the flight movement of the helicopter, a first coupling and a second coupling located on the first shaft both with a threaded form, a first hub located on the first shaft surrounding the first coupling all around that is form-fitting to the first coupling to enable the first coupling to make at least a partial spherical rotational movement, and a second hub located on the second shaft to be arranged opposite to the second coupling and being form-fitting to the second coupling.

15 Claims, 4 Drawing Sheets

HELICOPTER TAIL FOLDING MECHANISM

CROSS-REFERENCE

This application claims benefit of priority to Turkish Patent Application No. 2022/018286, filed Nov. 30, 2022, which is incorporated herein by reference in its entirety.

FIELD

This invention relates to a mechanism developed for folding the tail portion of a helicopter.

During transportation, the tail cone and main rotors of helicopters are folded in order to take up less space on the ship. The main rotor is folded from the hinges located at the hub connection. The tail cone, in turn, is folded perpendicular or somewhat angular to the horizontal axis at a horizontal line where through the tail's powertrain passes. While this folding operation is taking place, the tail transmitting power to the tail rotor is decoupled from the folding axis of the power transmission line. And when the tail is restored, the coupling is provided back. For this decoupling and coupling mechanism, a type of coupling commonly referred to as "face gear" is used. However, this type of coupling has disadvantages such as alignment, low reliability, limited flexibility, low load bearing capacity and short maintenance intervals. In order to eliminate these drawbacks to a large extent, the so-called "spline" gear design can be used. The tail folding mechanism comprises a hinge on the body. The tail is folded by rotating around this hinge. This hinge enables the rear tail cone to be folded down as much as the angle it makes with the horizontal axis. Thus, the tail rotor is prevented from hitting the ship's ceiling.

BACKGROUND

The United States patent document U.S. Pat. No. 6,050,521, which is included in the known state of the art, describes as a whole a helicopter comprising a main rotor with foldable blades along the body of the helicopter and a tail rotor carried by a tail section that can be folded with respect to the body. Sleeve is normally maintained in a limit axial position defined by inner teeth contacting guide ring, and by a helical spring coaxial with shaft and compressed between an outer intermediate shoulder of sleeve and an annular supporting element fitted to shaft and axially contacting gear. Sleeve is connected angularly to shaft by a splined coupling interposed between shaft and an intermediate portion of sleeve; and coupling is defined by helical teeth respectively inside sleeve and outside shaft, and which slope slightly by a few degrees with respect to axis D of shaft. More specifically, torque is transmitted from shaft via splined coupling to hub, and from hub to shaft via ring gear and gear; and transmission member is driven by shaft via splined coupling. On account of the helical shape of splined coupling between transmission member and shaft, member, as it slides axially, is rotated sufficiently to offset and so telescopically engage teeth. Spring may thus restore member to the limit position and ensure, in use, sufficient elastic pressure on member to keep it safely coupled with second transmission member. From one end of tubular portion, there extend integrally a flared flange having a flat annular peripheral edge, and a substantially conical supporting portion having a projecting pin of axis A.

SUMMARY

Thanks to a helicopter tail folding mechanism developed by this invention, a more reliable and a more practical solution is offered during maintenance, repair, assembly and disassembly of couplings.

A further object of the present invention is to design an easily accessible pin with a more compact design.

A further object of the present invention is to provide a simple and efficient tail folding mechanism without damaging the helicopter parts.

A further object of the present invention is to enable tail folding using a lighter mechanism in helicopters.

A further object of the present invention is to provide a helicopter tail folding mechanism in a more efficient, practical and economical manner.

The helicopter tail folding mechanism realized to achieve the object of the invention, as defined in the first claim and in the claims dependent thereon, comprises a rotor located on and providing the movement of the rotary wing air vehicle and generating the aerodynamic lift and thrust forces and control moments required for the air vehicle to hover in the air. It comprises a tail designed to be foldable according to user-predetermined requirements, thus ensuring the longitudinal stability of the body during forward flight. There is a front region on the tail and a rear region rotatably arranged on a point at which it is supported by the front region. There is a first shaft in the front region that transmits power simultaneously to the tail rotor during the flight of the rotary wing air vehicle, and a second shaft transmitting power in the rear region. A first coupling on the first shaft is in a threaded form and there is a second coupling almost adjacent thereto. A first hub in the form of a crown surrounds the first coupling all around in such a way that it can rotate at least partially, and is form-fitting to the first coupling. A second hub is located on the second shaft, is form-fitting to the first hub and is positioned against the second coupling. Active mode (A) is the mode in which the first shaft is coupled to the second shaft and power is transferred from the first shaft to the second shaft when the tail is folded and closed and connects the front and rear regions to each other and the second coupling engages into the second hub. Passive mode (P) is the mode in which the folded tail is unfolded and moved to rotate around the axis on which the rear region is supported, so that the contact between the front region and the rear region is at least partially interrupted and the first shaft and the second shaft are decoupled and no motion is transmitted.

The helicopter tail folding mechanism according to the present invention comprises a transmission element (spline) in the form of a helically-modified gear, which extends monolithically from the first hub such that the axis in which the first shaft extends is the center and forms the inner wall of the first shaft and moves rotationally with the first hub, enables the first coupling and the second coupling to engage each other more efficiently, in order to maintain power transmission to the tail which is brought from the passive mode (P) to the active mode (A). The transmission element with a helical form prevents the decoupling of the first coupling and the second coupling by applying a linear thrust (axial force) when the tail is in the active mode (A).

In an embodiment of the invention, the helicopter tail folding mechanism comprises the monolithic production of the first coupling and the second coupling.

In an embodiment of the invention, the helicopter tail folding mechanism comprises a dampener in contact with the first hub, damping the linear forward and backward movement of the first hub into the first shaft while the first hub is brought from the passive mode (P) to the active mode (A). The transmission element at least partially surrounds the damper all around. The dampener located in the first shaft, between the first shaft and the first coupling, moves forward towards the rear region in the direction in which they extend from the first shaft towards the first coupling when the first coupling and the second coupling switches from the active mode (A) to the passive mode (P), or moves backward towards the front region in the direction in which they extend from the first shaft towards the first coupling while it is switched from the passive mode (A) to the active mode (P).

In an embodiment of the invention, the helicopter tail folding mechanism comprises a mouth in a region on the first shaft where the first shaft is coupled to the main rotor. When the front region is switched from the passive mode (P) to active mode (A), the second hub slidingly moves from the teeth of the second coupling. The dampener slows down the movement of the first hub towards the mouth.

In an embodiment of the invention, the helicopter tail folding mechanism comprises a recess located on the first hub, extending into the first shaft, surrounding the dampener at least partially all around and supporting the dampener. There is a transmission element with a recessed inner wall form-fitting to the protrusions on the recess.

In an embodiment of the invention, the helicopter tail folding mechanism comprises a dampener that moves forward in the direction extending to the rear region in the direction extending from the first shaft to the first coupling while the front region is brought from the active mode (A) to the passive mode (P), or moves forward towards the mouth in the direction in which it extends from the first shaft to the first coupling while it is brought from the passive mode (A) to the active mode (A), thereby relieving the load on the front region.

In an embodiment of the invention, the helicopter tail folding mechanism comprises a stopper located close to the mouth so as to limit the movement of the dampener in the first shaft, having the same form as the cross-sectional area of the first shaft and limiting the linear movement of the recess.

In an embodiment of the invention, the helicopter tail folding mechanism comprises a fastener that centers and holds together the first coupling and the second coupling and enabling to mount the dampener so that it can move together with the first coupling. It contains a nut that enables a user to easily access the first coupling while in passive mode (P) during maintenance as a result of the first coupling being mounted to the pin in a removable manner.

In an embodiment of the invention, the helicopter tail folding mechanism comprises at least one shoulder in the form of a protrusion and positioned on the transmission element, thereby preventing the movement of the recess on the transmission element and keeping it stationary so that it almost completely dampens its linear movement.

In an embodiment of the invention, the helicopter tail folding mechanism comprises a fastener that centers and holds together the first coupling and the second coupling and enables to mount pin so that the dampener can be moved together with the first coupling. There is a recess with a recessed inner wall compatible with the protrusions on the fastener.

In an embodiment of the invention, the helicopter tail folding mechanism comprises a transmission element having a conical form so that it can be rotated and held on the inner wall of the recess.

In an embodiment of the invention, the helicopter tail folding mechanism comprises a sealing element located between the first coupling and the second coupling, preventing the entry of foreign substances such as dust, water etc. into the first shaft.

In an embodiment of the invention, the helicopter tail folding mechanism comprises a first suspension bearing that surrounds the transmission element all around and enables the first shaft to be placed on the front region, a second suspension bearing that connects the second hub to the rear region. It comprises a hinge that connects the first suspension bearing to the second suspension bearing and enables the second suspension bearing to rotate around itself on the axis to which it is connected.

In an embodiment of the invention, the helicopter tail folding mechanism comprises a helically-shaped transmission element that bears the first suspension bearing and is almost completely surrounded by the first suspension bearing.

In an embodiment of the invention, the helicopter tail folding mechanism comprises a dampener in the form of a wave spring.

BRIEF DESCRIPTION OF THE DRAWINGS

The helicopter tail folding mechanism realized to achieve the object of the present invention is shown in the accompanying figures, wherein.

Figure 1:
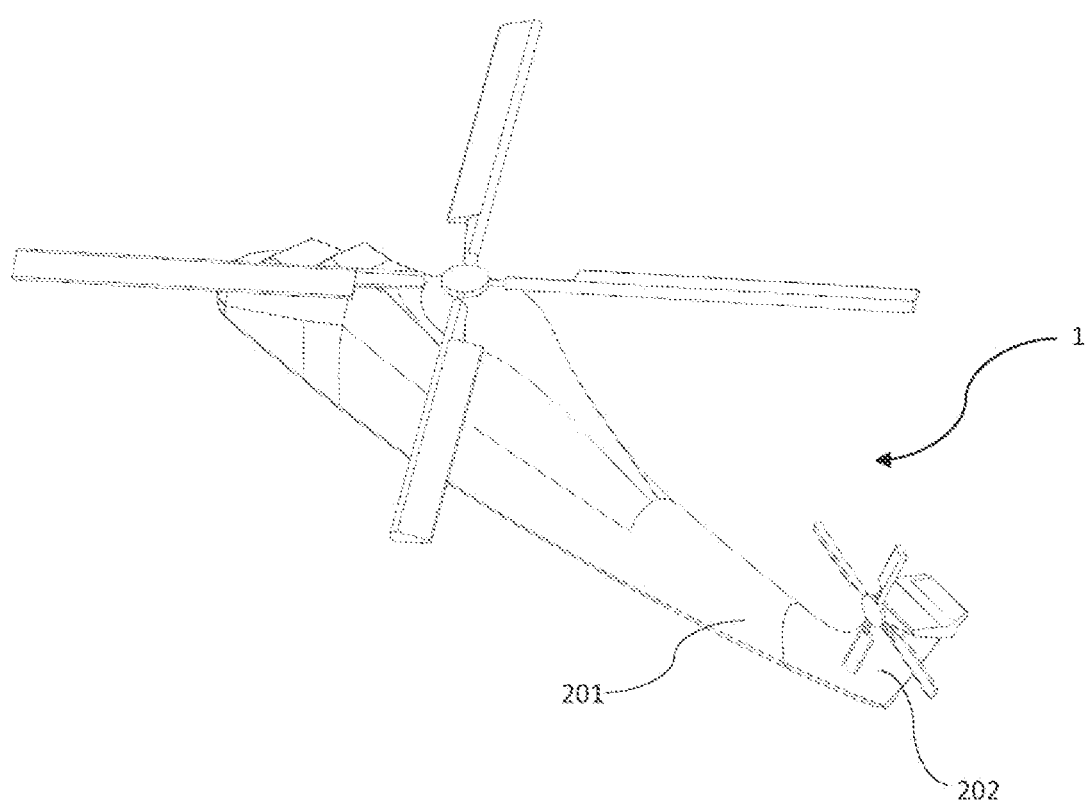
FIG. 1 is a perspective view of the active mode (A) of the helicopter tail folding system.
Figure 2:
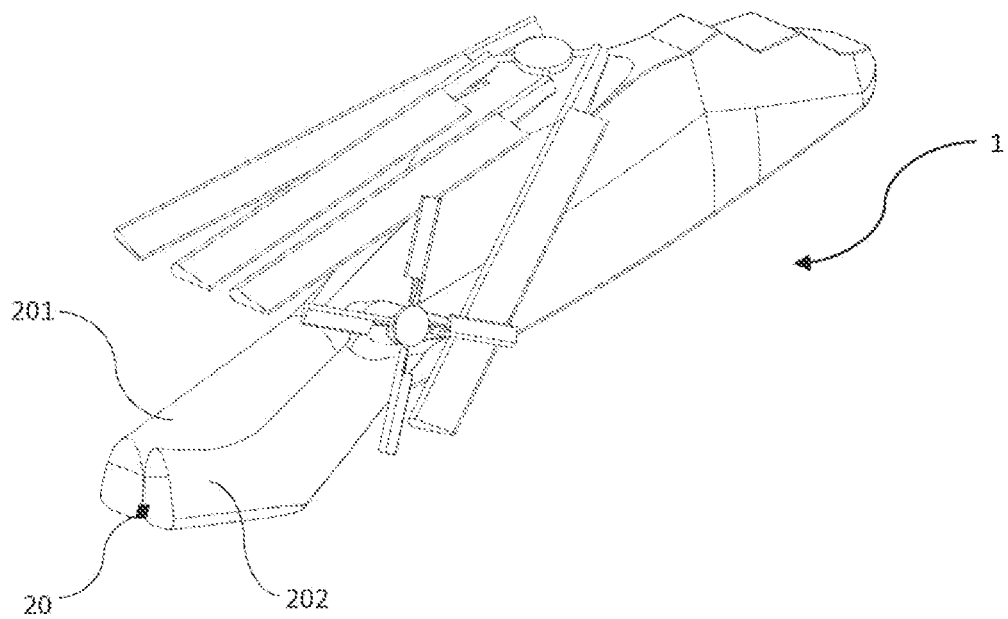
FIG. 2 is a perspective view of the passive mode (P) of the helicopter tail folding system.
Figure 3:
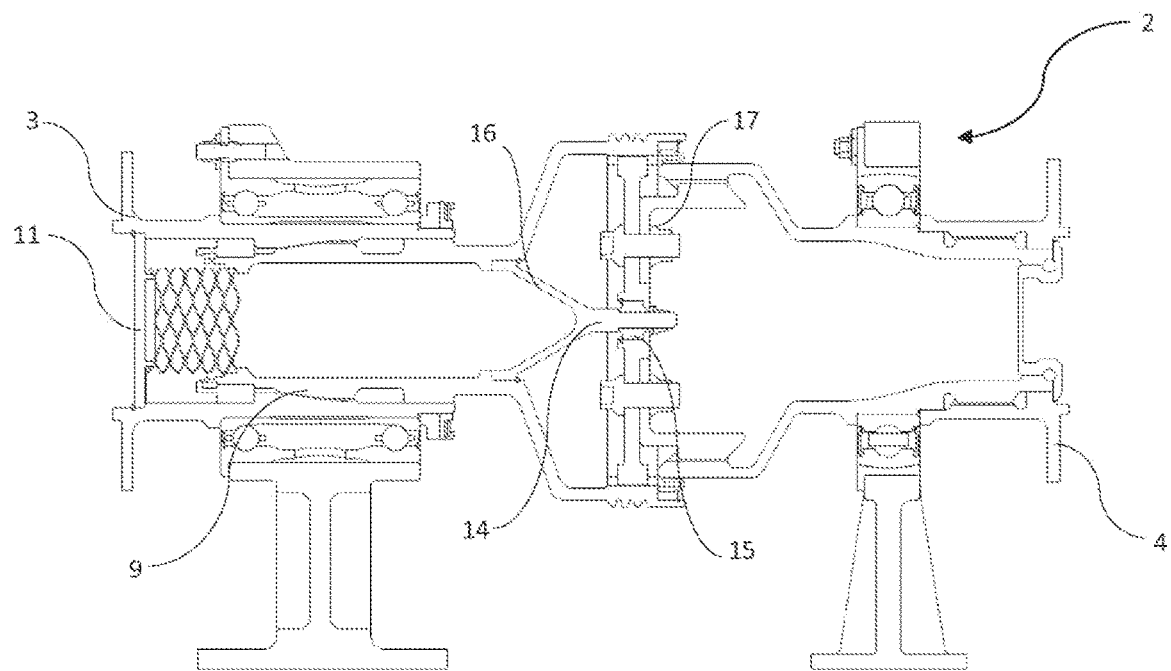
FIG. 3 is a cross-sectional view of the active mode (A) of the helicopter tail folding mechanism.
Figure 4:
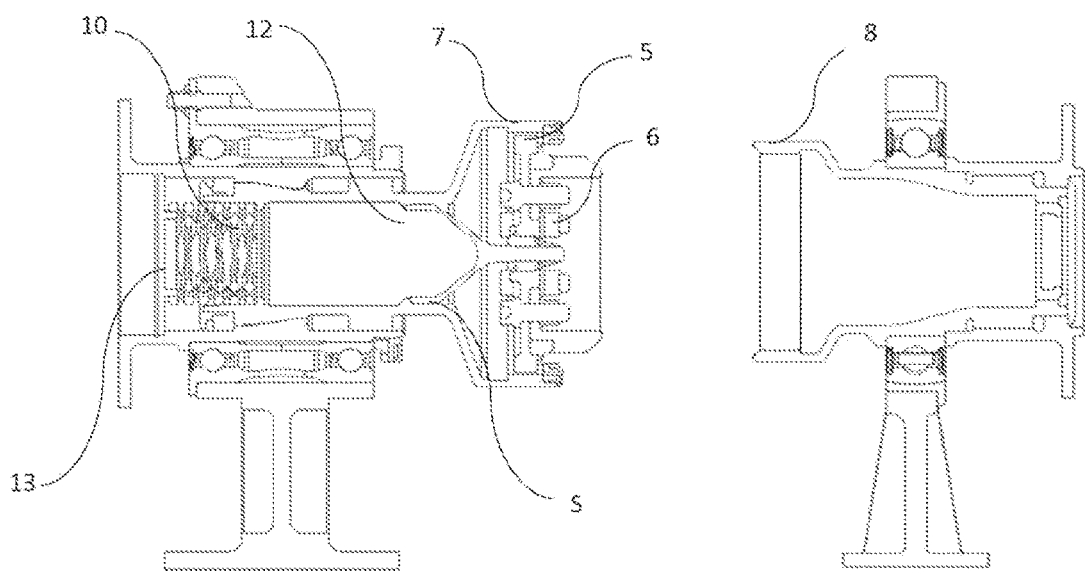
FIG. 4 is a cross-sectional view of the passive mode (P) of the helicopter tail folding mechanism.
Figure 5:
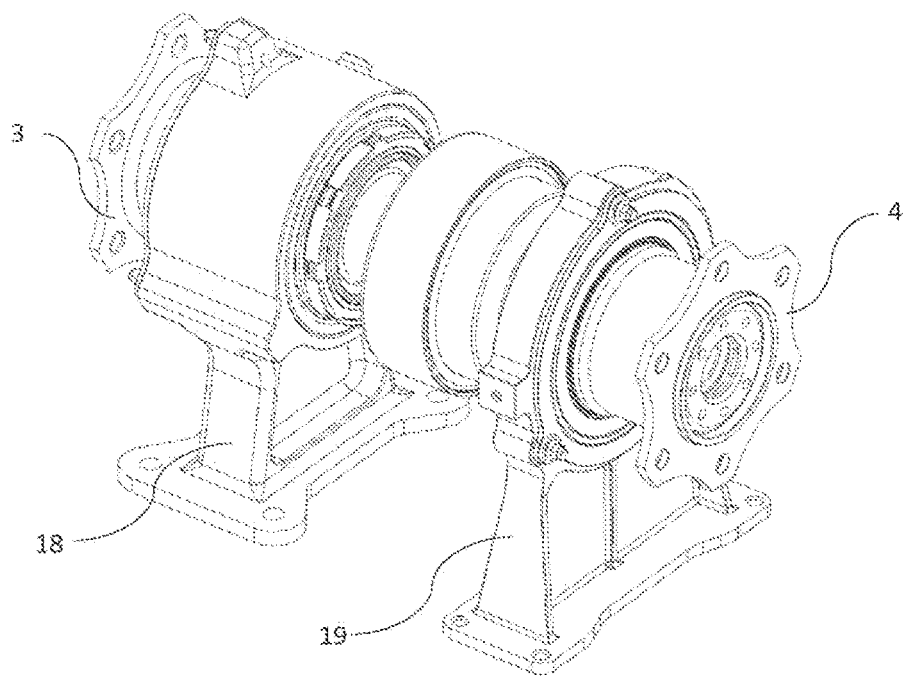
FIG. 5 is a perspective view of the helicopter tail folding mechanism.
Figure 6:
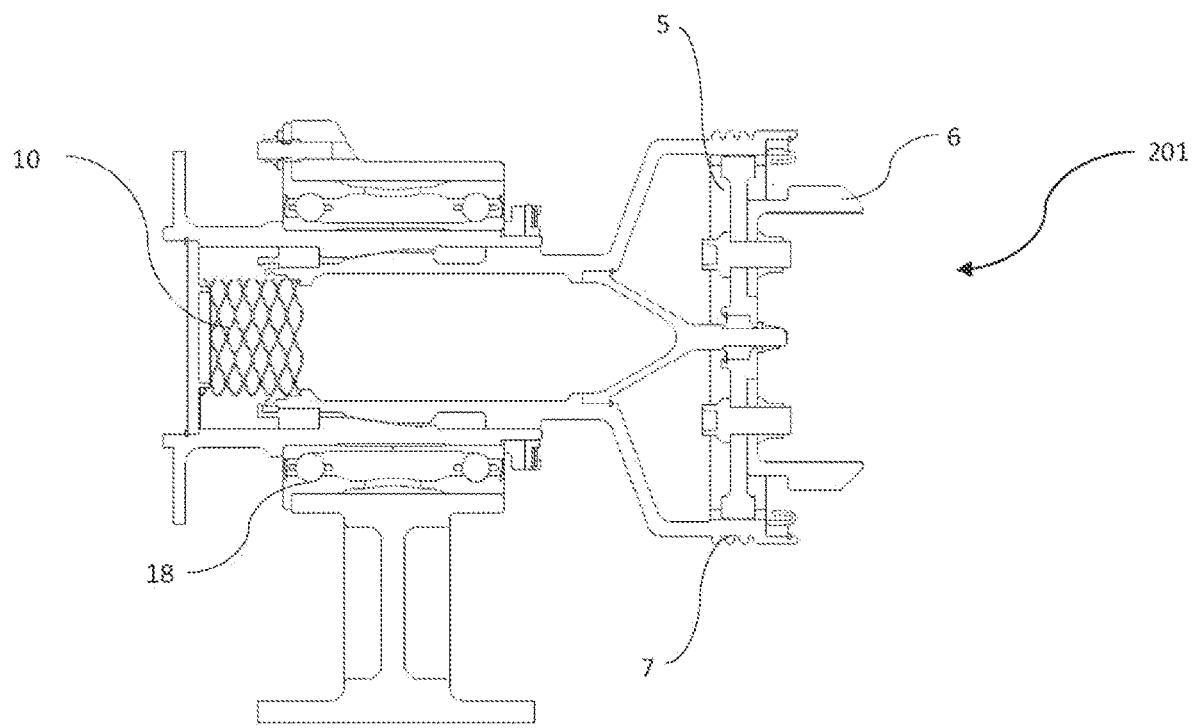
FIG. 6 is a cross-sectional view of the first shaft, the first coupling, the second coupling, the first hub.
Figure 7:
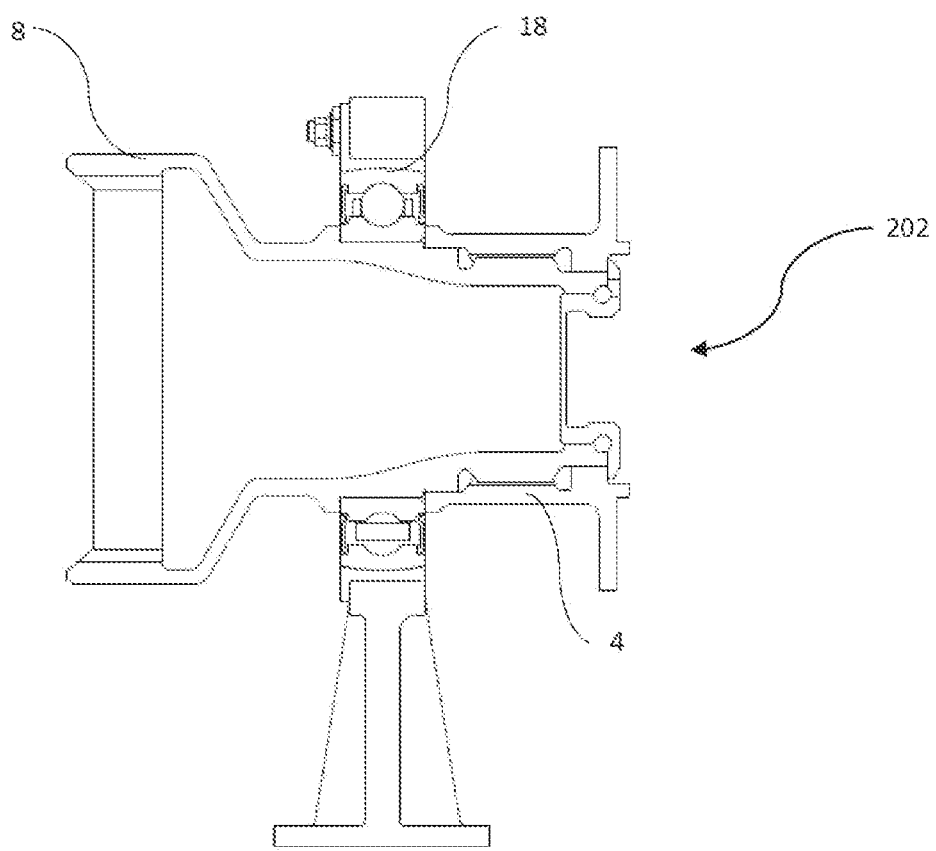
FIG. 7 is a cross-sectional view of the second shaft and the second hub.

The parts in the figures are individually designated as following.

1. Helicopter tail folding mechanism
2. Tail
   201. Front region
   202. Rear region
3. First shaft
4. Second shaft
5. First coupling
6. Second coupling
7. First hub
8. Second hub
9. Transmission element
10. Dampener
11. Mouth
12. Recess
13. Stopper
14. Pin
15. Nut
16. Shoulder
17. Gasket 18. First suspension bearing
19. Second suspension bearing
20. Hinge
   (A) Active mode
   (P) Passive mode
   (S) Fastener

DETAILED DESCRIPTION

The helicopter tail folding mechanism (1) comprises a tail (2) located on the helicopter, a front region (201) located on the tail (2), a rear region (202) connected to the front region (201) such as to be able to make a folding movement around the axis on which it is supported, a first shaft (3) located on the front region (201) and a second shaft (4) located on the rear region (202) enabling power to be transmitted to the tail rotor during the flight movement of the helicopter, a first coupling (5) and a second coupling (6) located on the first shaft (3) both with a threaded form, a first hub (7) located on the first shaft (3), surrounding the first coupling (5) all around and is form-fitting to the first coupling (5) so as to enable the first coupling (5) to make at least a partial spherical rotational movement, a second hub (8) located on the second shaft (4) so as to be arranged opposite to the second coupling (6) and being form-fitting to the second coupling (6), an active mode (A) in which power is transmitted from the first shaft (3) to the second shaft (4) by the placement of the second coupling (6) in the second hub (8), a passive mode (P) in which power transmission from the first shaft (3) to the second shaft (4) is prevented when the second coupling (6) is decoupled from the second hub (8) by the folding movement of the rear region (202) around the axis on which it is supported.

The helicopter tail folding mechanism (1) according to the invention comprises at least one helically-shaped transmission element (9) that extends monolithically from the first hub (7) such that the axis in which the first shaft (3) extends is the center and forms the inner wall of the first shaft (3) moves by rotating together with the first hub (7) and supports the engagement of the first coupling (5) and the second coupling (6) for the tail (2) brought from the passive mode (P) to the active mode (A).

There is a front region (201) on the helicopter tails (2) close to the main rotor and a rear region (202) that is able to connect to the front region (201) so as to be rotatable around the axis in which it is connected to the front region. A first shaft (3) transmitting power to the helicopter rotor during its flight is located in the front region (201), a second shaft (4) transmitting motion is located in the rear region (202). A first coupling (5) having a threaded form and a second coupling (6) having a threaded form are located on the first shaft (3). There is a first hub (7) located on the first shaft (3) that surrounds the first coupling (5) so as to be form-fitting to it and enables the first coupling (5) to make a spherical rotational movement around its center, and a second hub (8) located on the second shaft (4) so as to be against and form-fitting to the second coupling (6). As a result of the placement of the second hub (8) in the second coupling (6), there is an active mode (A) in which the first shaft (3) and the second shaft (4) provide power transmission. There is a passive mode (P) to which the rear region (202) is brought by rotating around the axis around which it is supported and removed from the front region (201), and the second coupling (6) and the second hub (8) are decoupled.

For the tail (2) brought to the active mode (A) from the passive mode (P) by the folding movement around the axis on which it is supported, it comprises a transmission element (9) on the axis in which the first shaft (3) extends on the tail (2), extends outward from the first hub (7) and forms the inner wall of the first shaft (3). Thanks to the fact that the transmission element (9) has a helical form, it rotates together with the first hub (7) and enables the first coupling (5) and the second coupling (6) to engage each other. Thanks to the fact that the transmission element (9) has a helical form, it ensures that the first coupling (5) and the second coupling (6) engage each other and do not decouple by applying a linear thrust along the axis where the first shaft (3) extends while the tail (2) is in the active mode (A).

In an embodiment of the invention, the helicopter tail folding mechanism (1) comprises monolithically produced first coupling (5) and second coupling (6). A lighter helicopter tail folding mechanism (1) is provided thanks to the tail (2) whose size is shortened by the monolithic production of the first coupling (5) and the second coupling (6).

In an embodiment of the invention, the helicopter tail folding mechanism (1) comprises at least one dampener (10) that is located in the first shaft (3) so as to be in contact with the first hub (7) and dampens the linear movement of the first coupling (5), dampener (10) that enables to at least partially dampen the movement of the first hub (7) into the first shaft (3), thus damping the linear movement of the first hub (5) while it is switched from the passive mode (P) to the active mode (A), and transmission element (9) that at least partially surrounds the dampener (10) all around. The first coupling (5) and the second coupling (6) move forward towards the rear region (202) in the direction in which they extend from the first shaft (3) towards the first coupling (5) while they are brought from the active mode (A) to the passive mode (P). The first coupling (5) and the second coupling (6) move back towards the front region (201) in the direction in which they extend from the first shaft (3) to the first coupling (5) while they are brought from the passive mode (P) to the active mode (A). In this way, it is enabled to prevent the first coupling (5) and the second coupling (6) from getting stuck to each other.

In an embodiment of the invention, the helicopter tail folding mechanism (1) comprises a mouth (11) on the side of the first shaft (3) where it is connected to the helicopter main rotor, dampener (10) that slows down the movement of the first hub (7) towards the mouth (11) during when the second hub (8) slides from the teeth of the second coupling (6) and gets placed in the first hub (7) while the front region (201) is brought from the passive mode (P) to the active mode (A) by a user. Thanks to the dampener (10) that dampens the linear motion, it is prevented that the first coupling (5) and the second coupling (6) are stuck to each other and while the mechanism is brought from the passive mode (P) to the active mode (A), the movement of the first hub (7) towards the mouth (11) is facilitated during when the second hub (8) slides from the teeth of the second coupling (6) and gets placed in the first hub (7).

In an embodiment of the invention, the helicopter tail folding mechanism (1) comprises a recess (12) located on the first hub (7) so as to extend into the first shaft (3), contacting the inner wall of the first shaft (3), at least partially surrounding the dampener (10) all around, enabling the dampener (10) to be supported, and transmission element (9) having a recessed inner wall compatible with the protrusions on the recess (12) having protrusions thereon. Thanks to the recess (12) having recesses and protrusions form-fitting to the transfer element (9), it is enabled to support the dampener (10) and the transfer element (9).

In an embodiment of the invention, the helicopter tail folding mechanism (1) comprises dampener (10) that moves forward towards the rear region (202) in the direction in which it extends from the first shaft (3) to the first coupling (5) while it is switched from the active mode (A) to the passive mode (P) or moves towards the mouth (11) in the direction in which it extends from the first shaft (3) to the first coupling (5) while it is brought from the passive mode (P) to the active mode (A) to at least partially dampen the load transferred to the front region (201). Thanks to the movement of the dampener (10) towards the mouth (11) in the direction in which it extends from the first shaft (3) towards the first coupling (5), it is enabled to reduce the load transferred to the front region (201).

In an embodiment of the invention, the helicopter tail folding mechanism (1) comprises a stopper (13) that enables the dampener (10) to be mounted so as to limit its movement into the first shaft (3), is form-fitting to the cross-sectional area of the first shaft (3), is located in a region close to the mouth (11) and limits the movement of the recess (12). Thanks to the stopper (13), it is enabled to store energy in the dampener (10).

In an embodiment of the invention, the helicopter tail folding mechanism (1) comprises a pin (14) located on the inner wall of the first shaft (3), extending out of the recess (12), thereby enabling the second coupling (5) to be mounted on the first coupling (4) and centering the first coupling (5) and the second coupling (6), and at least one nut (15) removably mounted to the pin (14) for the assembly/maintenance of the first coupling (5) and being located on the second coupling (6) so that it can be directly accessed by a user in the passive mode (P). Thanks to the pin (14), it is ensured that the first coupling (5) and the second coupling (6) are easily mounted to each other concentrically.

In an embodiment of the invention, the helicopter tail folding mechanism (1) comprises at least one shoulder (16) located on the transmission element (9) and having the form of a protrusion preventing the movement of the recess (12) on the transmission element (12). Thanks to the shoulder (16), it is ensured that the free movement of the transmission element (9) on the recess (12) is prevented.

In an embodiment of the invention, the helicopter tail folding mechanism (1) comprises pin (14) in the recess (12), centering the first coupling (5) and the second coupling (6), a fastener (S) enabling to mount the pin (14) to the recess (12) so that the dampener (10) and the first coupling (4) can be moved together, fastener (S) with protrusions on it, recess (12) having a recessed inner wall compatible with the protrusions on the fastener (S). The fastener (S) enables to mount the pin (14) onto the recess (12) so that the dampener (10) and the first coupling (4) can be moved together. Thanks to this, it is ensured that the first coupling (4) and the second coupling (5) overlap correctly and efficiently during tail folding.

In an embodiment of the invention, the helicopter tail folding mechanism (1) comprises recess (12) having a conical form so that it can be rotatably mounted to the inner wall of the transmission element (9). Thanks to the recess (12) having a conical form, it is enabled to facilitate the mounting of the transmission element (9) in the recess (12).

In an embodiment of the invention, the helicopter tail folding mechanism (1) comprises a gasket (17) located between the first coupling (5) and the second coupling (6), acting as a seal and preventing the entry of foreign substances such as water and dust into the first shaft (3). Thanks to the gasket (17), it is ensured that foreign substances such as water and dust are prevented from entering the first shaft (3).

In an embodiment of the invention, the helicopter tail folding mechanism (1) comprises first shaft (3) surrounding the transmission element (9), a first suspension bearing (18) enabling to mount the first shaft (3) to the front region (201), a second suspension bearing (19) enabling to mount the second hub (8) to the rear region (202), a hinge (20) connecting the first suspension bearing (18) and the second suspension bearing (19) to each other and enabling the second suspension bearing (19) to rotate and move around the axis on which it is connected. The first shaft (3) supports the first suspension bearing (18) and the second hub (8) is supported in the rear region (202) by the second suspension bearing (19).

In an embodiment of the invention, the helicopter tail folding mechanism (1) comprises helically-shaped transmission element (9) connected over the axis where the first suspension bearing (18) is supported and almost completely surrounded by the first suspension bearing (18). Thanks to the transmission element (9) located in the front region (201), it is ensured that the first suspension bearing (18) is supported.

In an embodiment of the invention, the helicopter tail folding mechanism (1) comprises dampener (10) in the form of a wave spring. Thanks to the dampener (10) in the form of a wave spring, more efficient damping is ensured at a shorter distance.

What is claimed is:

1. A helicopter tail folding mechanism (1) comprising:
    a tail (2) located on the helicopter,
    a front region (201) located on the tail (2),
    a rear region (202) connected to the front region (201) such as to be able to make a folding movement around an axis,
    a first shaft (3) located on the front region (201) and a second shaft (4) located on the rear region (202) enabling power to be transmitted to a tail rotor during flight movement of the helicopter,
    a first coupling (5) and a second coupling (6) located on the first shaft (3), both with a threaded form,
    a first hub (7) located on the first shaft (3), surrounding the first coupling (5) all around and form-fitting to the first coupling (5) so as to enable the first coupling (5) to make at least a partial spherical rotational movement,
    a second hub (8) located on the second shaft (4) so as to be arranged opposite to the second coupling (6) and being form-fitting to the second coupling (6),
    at least one helically-shaped transmission element (9) extending monolithically from the first hub (7) along an axis of the first shaft, and forming an inner wall of the first shaft,
    wherein the folding mechanism is configured to provide:
        an active mode (A) in which power is transmitted from the first shaft (3) to the second shaft (4) by placement of the second coupling (6) in the second hub (8), and in which the transmission element applies a linear thrust along the axis of the first shaft to engage the first and second coupling,
        a passive mode (P) in which power transmission from the first shaft (3) to the second shaft (4) is prevented when the second coupling (6) is decoupled from the second hub (8) by the folding movement of the rear region (202) around the axis.

2. The helicopter tail folding mechanism (1) according to claim 1, the first coupling (5) and the second coupling (6) being monolithically produced.

3. The helicopter tail folding mechanism (1) according to claim 1, comprising at least one dampener (10) located in the first shaft (3) so as to be in contact with the first hub (7), damping linear movement of the first coupling (5), enabling at least partial dampening of the movement of the first hub (7) into the first shaft (3), thereby damping the linear movement of the first hub (5) while it is switched from the passive mode (P) to the active mode (A), and the transmission element (9) at least partially surrounding the dampener (10).

4. The helicopter tail folding mechanism (1) according to claim 3, comprising a mouth (11) on a side of the first shaft (3) where the first shaft is connected to a helicopter main rotor, the dampener configured to slow down the movement of the first hub (7) towards the mouth (11) when the second hub (8) slides from teeth of the second coupling (6) and gets placed in the first hub (7) while the front region (201) is brought from the passive mode (P) to the active mode (A).

5. The helicopter tail folding mechanism (1) according to claim 3, comprising a recess (12) located on the first hub (7) so as to extend into the first shaft (3), contacting the inner wall of the first shaft (3), surrounding the dampener (10), enabling the dampener (10) to be supported, and the transmission element (9) having a recessed inner wall compatible with protrusions on the recess (12) having protrusions thereon.

6. The helicopter tail folding mechanism (1) according to claim 4, wherein the dampener (10) is configured to dampen a load transferred to the front region in both the passive (P) and active (A) mode.

7. The helicopter tail folding mechanism (1) according to claim 5, comprising a stopper (13) configured to enable the dampener (10) to be mounted so as to limit its movement into the first shaft (3), the stopper (13) being form-fitting to a cross-sectional area of the first shaft (3), the stopper (13) being located in a region close to a mouth (11) and limiting the movement of the recess (12).

8. The helicopter tail folding mechanism (1) according to claim 5, comprising:
   a pin (14) located on the inner wall of the first shaft (3), extending out of the recess (12), thereby enabling the second coupling (5) to be mounted on the first coupling (4) and centering the first coupling (5) and the second coupling (6), and
   at least one nut (15) removably mounted to the pin (14) for assembly/maintenance of the first coupling (5) and being located on the second coupling (6) so that it can be directly accessed in the passive mode (P).

9. The helicopter tail folding mechanism (1) according to claim 5, comprising at least one shoulder (16) located on the transmission element (9), having the form of a protrusion preventing movement of the recess (12) on the transmission element (9).

10. The helicopter tail folding mechanism (1) according to claim 8,
   wherein the pin (14) is located in the recess (12) and centers the first coupling (5) and the second coupling (6), and
   comprising a fastener(S) enabling to mount the pin (14) to the recess (12) so that the dampener (10) and the first coupling (4) can be moved together, the fastener(S) having protrusions thereon, the recess (12) having a recessed inner wall compatible with the protrusions on the fastener(S).

11. The helicopter tail folding mechanism (1) according to claim 5, wherein the recess (12) has a conical form so that it can be rotatably mounted to the inner wall of the transmission element (9).

12. The helicopter tail folding mechanism (1) according to claim 1, comprising a gasket (17) located between the first coupling (5) and the second coupling (6), acting as a seal and preventing entry of foreign substances into the first shaft (3).

13. The helicopter tail folding mechanism (1) according to claim 1, wherein the first shaft (3) surrounds the transmission element (9); and comprising:
   a first suspension bearing (18) enabling mounting the first shaft (3) to the front region (201),
   a second suspension bearing (19) enabling mounting the second hub (8) to the rear region (202), and
   a hinge (20) connecting the first suspension bearing (18) and the second suspension bearing (19) to each other and enabling the second suspension bearing (19) to rotate and move around the axis on which it is connected.

14. The helicopter tail folding mechanism (1) according to claim 13, wherein the transmission element (9) is helically-shaped and connected over an axis where the first suspension bearing (18) is supported and being surrounded by the first suspension bearing (18).

15. The helicopter tail folding mechanism (1) according to claim 3, wherein the dampener (10) has the form of a wave spring.

* * * * *